United States Patent [19]

Ward

[11] Patent Number: 4,700,321

[45] Date of Patent: Oct. 13, 1987

[54] TIMING SIGNAL GENERATOR

[75] Inventor: Stephen A. Ward, Chestnut Hill, Mass.

[73] Assignee: Proconics International, Inc., Woburn, Mass.

[21] Appl. No.: 882,039

[22] Filed: Jul. 7, 1986

Related U.S. Application Data

[63] Continuation of Ser. No. 496,459, May 20, 1983, abandoned.

[51] Int. Cl.[4] .................. G05B 19/18; G06F 15/46
[52] U.S. Cl. .................................. 364/569; 187/116; 318/696; 364/167; 364/474
[58] Field of Search ............ 364/167, 569, 718, 768, 364/474; 307/227, 265; 318/685, 696; 187/29 RMC; 62/228.4; 73/517 A

[56] References Cited

U.S. PATENT DOCUMENTS

| | | | |
|---|---|---|---|
| 3,840,814 | 10/1974 | Schiffman | 307/265 X |
| 3,908,195 | 9/1975 | Leenhouts | 318/696 X |
| 4,234,830 | 11/1980 | Cannon | 318/696 X |
| 4,362,979 | 12/1982 | Cannon | 318/696 X |
| 4,429,268 | 1/1984 | Yajima et al. | 318/696 |
| 4,432,439 | 2/1984 | Caputo et al. | 187/29 R |
| 4,446,411 | 5/1984 | Song | 318/696 |
| 4,449,196 | 5/1984 | Pritchard | 364/768 |

Primary Examiner—Gary Chin
Assistant Examiner—Kevin J. Teska

[57] ABSTRACT

Circuitry for providing timing signals spaced in time by a varying amount, the circuitry including calculating means for repetitively performing a calculation to repetitively provide calculation signals the value (SUM) of which varies as a function of the number of times the calculation has been repeated, and timing signal generating means for receiving the calculation signals and providing a series of timing signals spaced in time by varying amounts, a timing signal being generated each time the value (SUM) has changed by a set amount (ACC).

13 Claims, 5 Drawing Figures

TIMING SIGNAL GENERATOR

This is a continuation of co-pending application Ser. No. 496,459 filed on May 20, 1983, now abandoned.

BACKGROUND OF THE INVENTION

The invention relates to apparatus for providing timing signals spaced in time by a varying amount, and in particular to apparatus for providing timing signals to a stepping motor.

A stepper motor rotates a given angle in response to each digital step signal that it receives, and in many applications it is desirable to accelerate a stepper motor at a fixed maximum rate. To cause acceleration of the stepper motor, it is necessary to successively decrease the time periods between the step signals; specifically, the time period between timing signals should be proportional to the reciprocal square root of the number of steps that have been taken.

SUMMARY OF THE INVENTION

In general the invention features circuitry for providing timing signals spaced in time by a varying amount, the circuitry including calculating means for repetitively performing a calculation to repetitively provide calculation signals the value (SUM) of which varies as a function of the number of times the calculation has been repeated, and timing signal generating means for receiving the calculation signals and providing a series of timing signals spaced in time by varying amounts, a timing signal being generated each time the value (SUM) has changed by a set amount (ACC).

In preferred embodiments the circuitry includes a programmable digital computer and program, the calculating means and the timing signal generating means being implemented as steps of the program; the calculating means repetitively provides calculation signals the value (SUM) of which varies quadratically with respect to the number of times the calculation has been repeated; the calculating means provides the calculation signals spaced in time by equal amounts; the timing signal generating means includes means to compare SUM with a comparison value and comparison adjustment means to adjust the comparison value each time a timing signal is generated (preferably either by decreasing SUM by the set amount ACC or by setting the comparison value to the product of ACC and NSTEPS, where NSTEPS is the number of timing signals that have been generated); the calculating means includes count adjustment means to adjust the value N of a count signal each time a calculation signal has been provided, so that SUM varies quadratically with respect to N; the count adjustment means includes means to selectively increase N each time a calculation signal is provided or decrease N each time a calculation signal is provided or cause N to remain the same each time a calculation signal is provided, so that the period between the timing signals respectively decreases, increases or remains the same with respect to time; the timing equal generating means includes acceleration/deceleration means to selectively adjust the count adjustment means in response to the number of timing signals that have been provided; the apparatus is used to provide timing signals for a stepper motor to operate a given number of steps by accelerating at a constant rate to a fixed speed, by operating at the fixed speed and by decelerating at a constant rate so that the given number of steps is reached as the deceleration is completed, and the count adjustment means increases N each time a calculation signal is provided until N reaches a value corresponding to the fixed speed, the acceleration/deceleration adjustment means provides a signal indicating how many steps were required to reach the fixed speed, and the count adjustment means maintains N at that value until the number of steps remaining to reach the given number of steps equals the number required to reach the fixed speed, at which time N is decreased each time a calculation signal is provided; the repetitive calculation comprises repetitively adding N+N+1 or repetitively adding N.

Using the invention, one can simply and efficiently provide timing signals, e.g. by using simple adding, subtracting and comparison operations, without the need for more complicated multiplication, division or square root operations. In particular the invention can be used to efficiently and simply drive a stepper motor to provide a given number of steps in a given time at maximum permissible acceleration, deceleration and speed.

Other features and advantages of the invention will be apparent from the following description of the preferred embodiment, and from the claims.

DESCRIPTION OF THE PREFERRED EMBODIMENT

Figure 1:
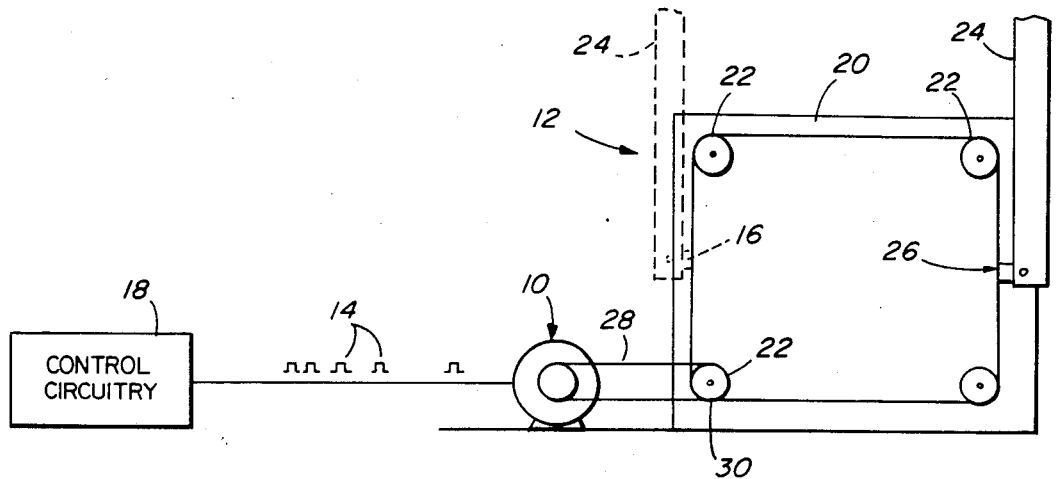
FIG. 1 is a diagram of apparatus driven by a stepper motor according to the invention.

Referring to FIG. 1, there is shown stepper motor 10 for driving apparatus 12 in response to timing signals 14 provided by timing signal circuitry 18. Apparatus 12 includes chain 20 supported by sprockets 22 and arm 24 connected by means 26 to chain 20. Stepper motor 10 drives apparatus 12 via chain 28, which drives sprocket 30 connected to lower left hand sprocket 22. Apparatus 12 is described in more detail in U.S. Pat. No. 4,493,606 filed May 24, 1982, which is hereby incorporated by reference.

Figure 2:
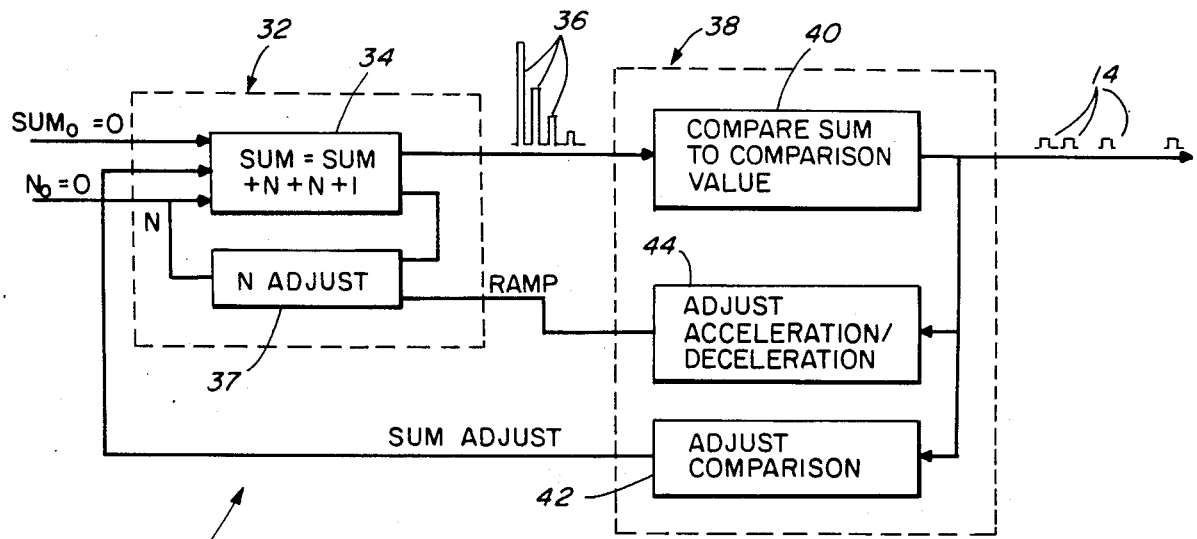
FIG. 2 is a functional block diagram of circuitry used to provide timing signals in the FIG. 1 stepper motor apparatus.
Figure 3:
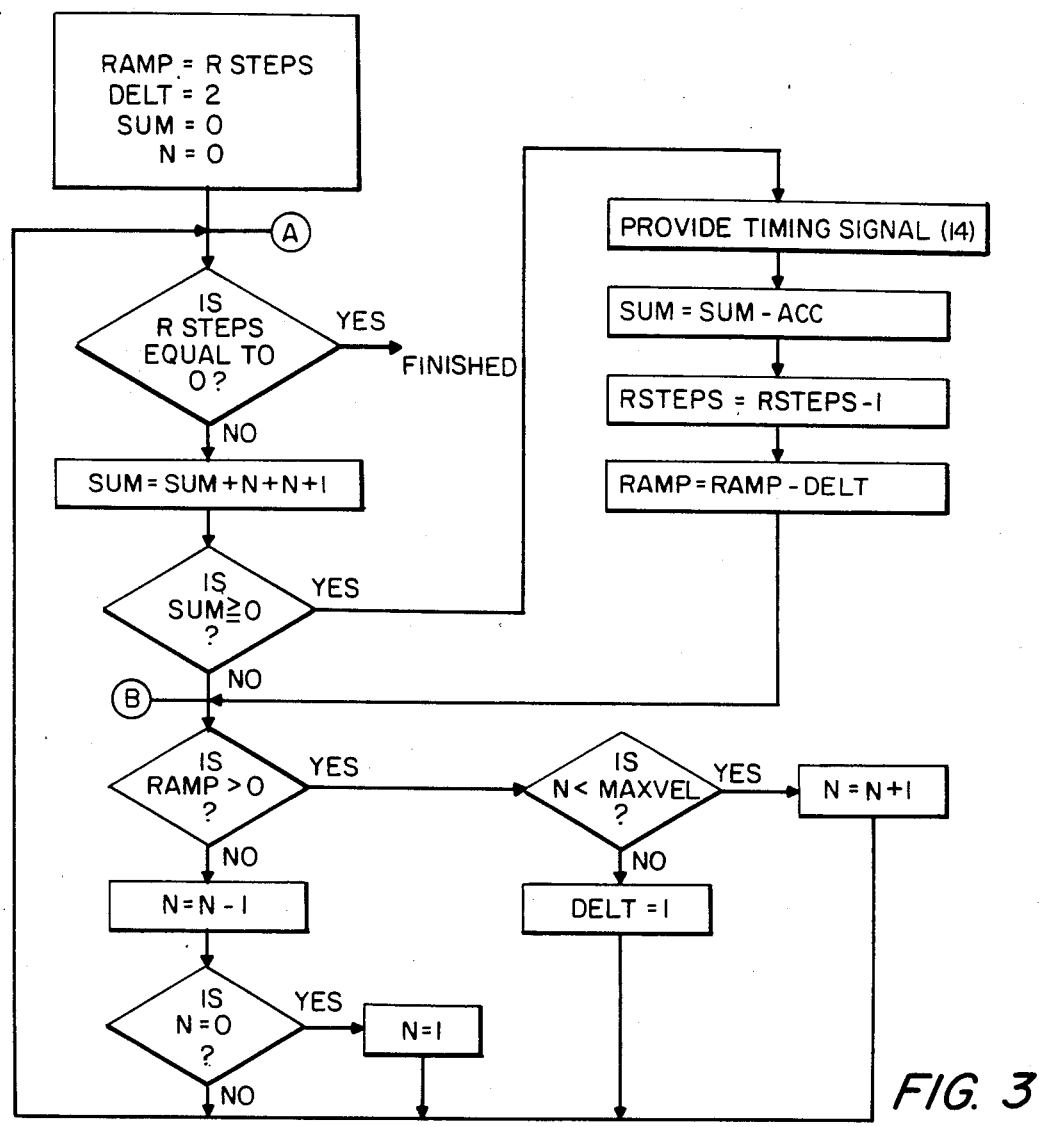
FIG. 3 is a flow chart of a program implemented by the FIG. 2 circuitry.

Referring to FIG. 2, a functional block diagram for circuitry 18 (an Intel 8080 microprocessor controlled by the program described in the flow chart of FIG. 3) is shown. Circuitry 18 includes calculating means 32, which repetitively performs a simple calculation via summing means 34 such that the value SUM of the output signals 36 varies quadratically with respect to the number of times that the calculation has been repeated. Calculating means 32 also includes count adjustment means 37 to adjust the value of N after each repetitive calculation has been completed.

Calculation signals 36 are repetitively spaced in time by a constant amount and are provided to timing signal generating means 38, including comparison means 40, comparison adjustment means 42 and acceleration/deceleration means 44. Comparison means 40 compares the value SUM of calculation signals 36 with a comparison value and provides timing signals 14 each time that the value (which comparison value is zero in the algorithm described in FIG. 3) SUM exceeds the comparison value. Comparison adjustment means 42 provides a SUM adjustment signal to summing means 34 each time that a timing signal 14 has been provided. Acceleration/deceleration means 44 provides a signal to count adjustment means 37 after a plurality of timing signals 14 have been provided to control whether count adjustment means 37 increases or decreases after each calculation signal 36 to provide acceleration, constant speed, or deceleration.

In operation, circuitry 18 provides timing signals 14 to stepper motor 10 to drive arm 24 via chain 26 in both vertical and horizontal directions from the position shown between the right hand sprockets 22 in FIG. 1 to a position between the left hand sprockets 22 (as is shown in phantom in FIG. 1). After a certain operation occurs, arm 24 is moved back to the position between the right hand sprockets 22. The travel between the two positions takes a certain total number of steps of stepper motor 10. It is desirable that the travel between the two positions be accomplished in as short a time as possible; thus, stepper motor 10 is accelerated at a maximum permissible rate until a maximum speed is reached, and then it travels through a number of steps at the maximum speed and decelerates at a maximum deceleration rate to the end position. Timing signals 14 are shown diagrammatically in both FIGS. 1 and 2 to have decreasing periods of time between successive signals to provide acceleration. During the constant speed portion of the travel, timing signals 14 are separated in time by constant amounts. During the deceleration portion of the travel, the period of time between successive timing signals 14 increases.

During the acceleration portion of travel, the period between timing signals 14 is proportional to the reciprocal square root of the number of timing signals 14 that have been received so far. Timing signal generating means 38 provides signals 14 spaced in time by the desired varying time periods based upon the time it takes calculating means 32 to perform a repetitive calculation, regardless of the value of the calculated number. Specifically, calculating means 32 provides calculation signals 36 repetitively spaced in time by the time it takes summing means 34 to perform a simple addition step, and timing signal generating means 38 provides time signals 14. Timing signals 14 are provided when the value SUM changes by a prescribed constant amount ACC, and are spaced in time by varying amounts, because the value SUM of calculation signals 36 increases as the square of the number of calculations (generally equal to N) or as the square of time. During the acceleration stage, count adjustment means 37 increases N by one during each successive addition step of summing means 34. During the constant speed portion of travel, N remains constant; although SUM is increasing, it is increasing at a constant rate and not at a quadratically varying rate so that the timing between timing signals 14 is constant. During the deceleration phase of travel, count adjust means 37 decreases the value of N so that the value SUM decreases quadratically with time, and the time period between timing signals 14 increases with time.

Turning to FIG. 3, there is shown a flow chart for the computer program that provides timing signals 14. A listing of the program (in assembly language for the Intel 8080) is included below. The program of FIG. 3 implements the changes between the three modes of stepper motor operation (acceleration, deceleration, and constant speed) using the variable RAMP. The number of steps (or timing signals 14) taken in the acceleration and deceleration modes are equal. RAMP is intialized to the total number of steps RSTEPS remaining to be taken, and is decremented by two each time there is a timing signal 14 during the acceleration mode until the maximum fixed velocity is reached. N is incremented by one during the acceleration mode until the maximum velocity (related to N) is reached. The value of RAMP remaining at the end of the acceleration mode is precisely the number of constant velocity steps to be taken, and RAMP is decremented by one for the constant velocity steps, while N remains constant. When RAMP is equal to zero, the deceleration mode begins, and N is decremented by one until N equals zero, at which time the number of remaining steps, RSTEPS, equals zero.

Referring specifically to FIG. 3, initially the variable RAMP is set to the total number of steps remaining to be taken, or to RSTEPS, DELT, the number by which RAMP is decremented, is set equal to two; SUM is set equal to zero, and N is set equal to zero. Beginning the loop at point A on the flow chart, SUM is initially increased by adding to it $N+N+1$. As N is repetitively increased by one with each calculation from 0 to 1 to 2 to 3 to 4, etc., $N+N+1$ increases from 1 to 3 to 5 to 7 to 9 (i.e., the values are consecutive odd integers) and SUM increases from 1 to 4 to 9 to 16 to 25, etc.; i.e., SUM increases quadratically with respect to the number of times N that the calculation has been repeated.

Each time that SUM is greater than or equal to zero, a timing signal 14 is provided; SUM is decreased by constant amount ACC; the number of steps remaining to be taken, RSTEPS, is decremented by one; RAMP is decremented by two, and the computer is now at point B on the flow chart. RAMP is still greater than zero after the first timing signal 14 has been provided, and N is still less than a constant MAXVEL (a value corresponding to N when the velocity of stepping motor 10 is at its fixed maximum value); thus N is increased by one and the loop begins again at point A.

This time the SUM starts out at $-ACC$ and is increased by $N+N+1$. SUM is less than zero; RAMP is still greater than zero; N is still less than MAXVEL; and N is increased by one through a plurality of repetitive summing calculations with SUM increasing quadratically with respect to the number of calculations until once again it is greater than or equal to zero. At this point, once again, a timing signal 14 is provided; the SUM is decreased by the constant ACC; RSTEPS is decremented by one; RAMP is decremented by DELT, and the computer is at point B on the flowchart. Assuming that RAMP is still greater than zero, and N is less than MAXVEL, N is increased by one, and SUM, which has just had the constant ACC subtracted from it, is increased by $N+N+1$. The computer continues to go through the loop after point B involving an increase in N by one during the repetitive calculations until once again SUM is greater than or equal to zero (in other words until SUM has increased by the amount ACC again). Because N is continuously increasing, the number of loops or repetitive calculations it takes SUM to increase from $-ACC$ to zero decreases, and thus the time periods between timing signals 14 also decreases. This continues until the maximum velocity is reached, at which point N is greater than or equal to MAXVEL.

At this point stepper motor 10 goes in to the constant velocity mode, by continuing the repetitive calculations with N being a constant value, and DELT is set equal to one. Because N is constant, the number of steps it takes SUM to increase from −ACC to zero is constant, and the time periods between timing signals 14 are constant. Each time that a timing signal 14 is provided, RAMP is now decremented by one (because DELT has been set equal to one).

When RAMP equals zero the constant velocity mode is complete, and stepper motor 10 goes into the deceleration mode. At this point N is decremented by one, and thus each time a timing signal 14 is provided, it takes longer and longer for SUM to be increased from −ACC to zero, because SUM is increased during each repetitive calculation by a smaller value. When N equals zero, RSTEPS also equals zero, and travel of arm 24 is complete.

Listings of the program used by circuitry 18 in C language and in assembly language (slightly modified, as described below) are as follows:

```
                Copyright 1982    Proconics, Inc.

25:  : Slick(acc, maxvel, nsteps, motor)
 26:  :   long acc;
 27:  :   short maxvel, nsteps;
 28:  : {
 29:  :     short n, delt, ramp;
 30:  :     long sum;
 31:  :     ramp = nsteps;
 32:  :     delt = 2;
 33:  :
 34:  :     sum = 0;
 35:  :     n = 0;
 36:  :     do { sum += (n+n+1);                    /* giving real squares */
 37:  :          if (sum >= 0)
 38:  :                { sum -= acc;
 39:  :                  Step(motor);
 40:  :                  nsteps--;
 41:  :                  ramp -= delt;
 42:  :                }
 43:  :          if (ramp > 0)
 44:  :                { if (n < maxvel) n++;
 45:  :                  else delt = 1; }
 46:  :          else  { if (--n == 0) n = 1; }
 47:  :
 48:  :     } (while nsteps;)
 49:  : }

67:
 68:          maclib  bds           ; system info and run-time constants
 69:          maclib  cmac          ; macro library
 70:
 71:          direct                ; function directory
 72:          define  slick
 73:          enddir
 74:
 75:  : slick(m, nsteps)
 76:  :   struct Motor {
 77:  :                       int acc;        /* 0 accelleration constant  */
 78:  :                       int maxvel;     /* 2 max velocity            */
 79:  :                       unsigned where; /* 4 absolute position       */
 80:  :                       char phase;     /* 6 motor phase             */
 81:  :                       char phmask;    /* 7 phase mask: 7. for 8-phase */
 82:  :                       char *phtab;    /* 8 phase table pointer     */
 83:  :                       char port;      /* 10 port number            */
 84:  :                       char outmask;   /* 11 output mask            */
 85:  :                    } *m;
 86:  :   int nsteps;
 87:
 88:          prelude slick         ; main entry point.
 89:
 90:  : Set up statics:
 91:  :         arg1: struct Motor pointer
 92:  :         arg2: signed nsteps
 93:  :         arg3: abs(nsteps)
 94:  :         arg4: output routine
 95:  :         arg5: n (current count)
 96:  :         arg6: ramp
 97:  :         arg7: Sum1, Sum2
 98:
 99:  : register assignments:
100:  :         B:    Sum0 (low order byte of 3-byte sum)
101:  :         C:    delt
102:
103:          call    argphak       ; copy the args into arg1, arg2, etc.
104:          push    b             ; save BC on the stack
105:
106:  : Following code sets up a little output routine in RAM allocated from
107:  : the stack. It copies the prototype routine from ROM at sl91, filling
108:  : in port number (2 places) and outmask (1 place) in the copy.
109:  : Pointer to copy is left in global location arg4.
```

```
110:
111:        push    b                   ; reserve 8 bytes for our
112:        push    b                   ; little cutout routine
113:        push    b
114:        push    b
115:        lxi     h,0
116:        dad     sp
117:        shld    arg4                ; ptr to 8-byte region.
118:
119:        lhld    arg1                ; fetch port, outmask from struct Motor
120:        lxi     d,10                ; offset for port
121:        dad     d
122:        mov     e,m                 ; port.
123:        inx     h
124:        mov     d,m                 ; outmask.
125:
126:        reloc (lxi b,),s191         ; ptr to prototype routine
127:        lhld    arg4                ; ptr to copy
128:        ldax    b                   ; IN
129:        inx     b
130:        mov     m,a
131:        inx     h
132:        mov     m,e                 ; port
133:        inx     b
134:        inx     h
135:        ldax    b                   ; ANI
136:        mov     m,a
137:        inx     b
138:        inx     h
139:        mov     m,d                 ; outmask
140:        inx     b
141:        inx     h
142:        ldax    b                   ; ORA E
143:        mov     m,a
144:        inx     b
145:        inx     h
146:        ldax    b
147:        mov     m,a                 ; OUT
148:        inx     b
149:        inx     h
150:        mov     m,e                 ; port
151:        inx     b
152:        inx     h
153:        ldax    b                   ; ret
154:        mov     m,a
155:
156:        lhld    arg2                ; nsteps
157:        mov     a,h
158:        ora     a                   ; is it negative?
159:        reloc jp,s132               ; nope.
160:        mov     a,h                 ; negate it.
161:        cma
162:        mov     h,a
163:        mov     a,l
164:        cma
165:        mov     l,a
166:        inx     h                   ; 2s complement.
167: s132:  shld    arg3                ; abs nsteps.
168:        shld    arg6                ; ramp=nsteps.
169:
170:        lxi     h,0                 ; clear some stuff.
171:        shld    arg7                ; Sum=0
172:        mov     b,h
173:        mvi     c,2                 ; delt=2
174:
175:        lxi     h,MINVEL            ; minimum velocity.
176:        shld    arg5                ; n=MINVEL
177:
178:
179: ; the main loop:
180: ; Sum += n
181:
182: s10:   lda     arg5                ; n0
183:        add     b
184:        mov     b,a
185:        lxi     h,arg7              ; for adds to memory.
186:        lda     arg5+1
187:        adc     m
188:        mov     m,a
189:        inx     h                   ; high byte carry propagate
190:        mov     a,m                 ; Sum2
191:        aci     0
192:        mov     m,a
193:
194: ; if (Sum >= 0)
195:
```

```
196:            reloc   jm.s11          ; not >= 0.
197:
198: ; Sum -= acc
199:
200:            lhld    arg1            ; struct Motor pointer.
201:            mov     e,m             ; acc0
202:            inx     h
203:            mov     d,m
204:            lhld    arg7            ; high 16 sum bits.
205:            dad     d               ; Sum12 + acc (which must be negative)
206:            shld    arg7
207:
208:            lhld    arg3            ; nsteps--;
209:            dcx     h
210:            shld    arg3
211:
212:            lhld    arg6            ; ramp -= celt
213:            mov     a,l
214:            sub     c
215:            mov     l,a
216:            mov     a,h
217:            sbi     0
218:            mov     h,a
219:            shld    arg6
220:
221: ; here we step the motor. First, find which direction we're going
222:
223:            lxi     d,4
224:            lhld    arg1            ; point to Motor->where.
225:            dad     d
226:            mov     e,m
227:            inx     h
228:            mov     d,m             ; DE = m->where.
229:            inx     h               ; HL = &(m->phase).
230:
231:            lda     arg2+1          ; high nsteps. for sign bit
232:            ora     a
233:            reloc   jp.s13          ; go forward.
234:
235:            dcx     d               ; go backward.
236:            mov     a,m             ; new phase...
237:            dcr     a
238:            reloc   jmp.s133
239:
240: s13:       inx     d               ; go forward
241:            mov     a,m             ; new phase...
242:            inr     a
243:
244: s133:      dcx     h               ; store away updated m->where...
245:            mov     m,d
246:            dcx     h
247:            mov     m,e
248:            inx     h
249:            inx     h
250:            inx     h               ; m->mask.
251:            ana     m               ; and it back...
252:
253:            dcx     h
254:            mov     m,a             ; store away the phase.
255:            mov     e,a             ; use phase to index table.
256:            xra     a
257:            mov     d,a             ; DE = new phase
258:            inx     h               ; HL->onmask
259:            inx     h               ; HL->ontab
260:            mov     a,m
261:            inx     h
262:            mov     h,m             ; high ontab
263:            mov     l,a             ; low ontab
264:            dad     d               ; ontab[phase]
265:
266:            reloc   (lxi d,).s14    ; for a return adr
267:            push    d               ; to emulate a call.
268:            mov     e,m             ; grab the new output byte in E
269:            lhld    arg4            ; our constructed output routine.
270:            pchl                    ; enter it.
271:
272: ; the return point:
273:
274: s14:
275:
276: ; if (ramp)0) ...
277:
278: s11:       lhld    arg6            ; ramp
279:            mov     a,h
280:            ora     a
281:            reloc   jm.s12
282:            ora     l
```

```
283:            reloc   jz,s19              ; ramp == 0 ... don't change n.
284:
285: ; here on ramp)0.  if (n<maxvel) n=maxvel; just checks for zero.
286:
287:            lhld    arg1                 ; struct Motor ptr
288:            inx     h
289:            inx     h                    ; point to maxvel
290:            mov     e,m
291:            inx     h
292:            mov     d,m
293:            lhld    arg5                 ; n
294:            dad     d                    ; n+maxvel, which must be negative
295:            mov     a,h                  ; is n=maxvel?
296:            ora     l
297:            reloc   jz,s111              ; yup, dont go faster.
298:
299:            lhld    arg5                 ; else, increment n once more.
300:            inx     h
301:            shld    arg5
302:            reloc   jmp,s19              ; to close the loop.
303:
304: ; here on n=maxvel; delt = 1.
305:
306: s111:      mvi     c,1
307:            reloc   jmp,s19
308:
309: ; here on ramp <= 0... if (--n == MINVEL) n=MINVEL.
310:
311: s12:       lxi     d,-MINVEL
312:            lhld    arg5
313:            dcx     h                    ; --n
314:            shld    arg5
315:            dad     d                    ; --n - MINVEL
316:            mov     a,h
317:            ora     a
318:            reloc   jc,s19               ; if --n >= MINVEL
319:            lxi     h,MINVEL             ; else, n = MINVEL
320:            shld    arg5
321:
322: ; Here to close the loop; repeat so long as nsteps>1.
323:
324: s19:       lhld    arg3                 ; nsteps
325:            mov     a,h
326:            ora     l
327:            reloc   jnz,s10              ; to keep looping.
328:
329: ; clean up, exit;
330:
331:            pop     b                    ; Remove the output routine.
332:            pop     b
333:            pop     b
334:            pop     b
335:
336:            pop     b
337:            lxi     h,0                  ; always return 0, for now.
338:            ret
339:
340: ; little prototype output routine: port and mask get filled in by
341: ;    initialization code in the copy made on the stack.
342: ; ANDs existing output value with outmask, ORs in contents of E,
343: ;    and outputs the result (so as not to disturb other bits).
344:
345: s191:      in      0                    ; 0: read the port
346:            ani     0                    ; 2: mask filled in
347:            ora     e                    ; 4: OR with new value from E
348:            out     0                    ; 5: port gets filled in.

349:            ret                          ; 7:
350:
351:            postlude        slick
```

OTHER EMBODIMENTS

Other embodiments of the invention are within the scope of the following claims.

Figure 4:
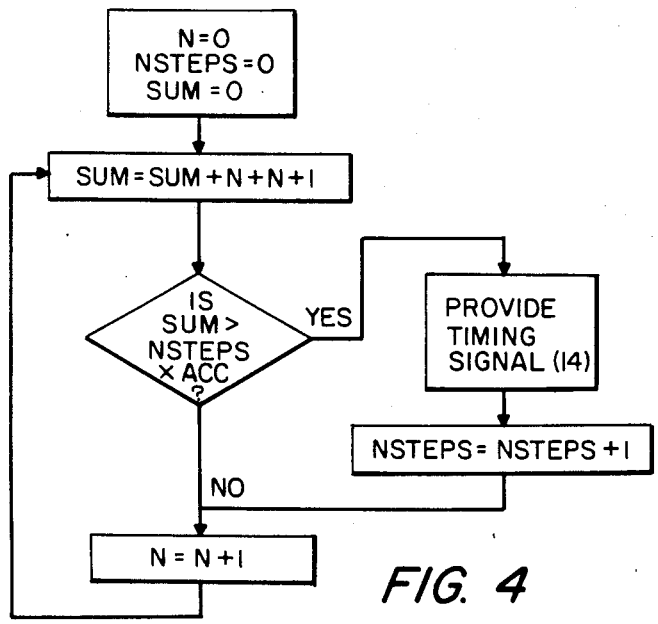
FIG. 4 is a flow chart of an alternative method to provide timing signals spaced in time by a varying amount.
Figure 5:
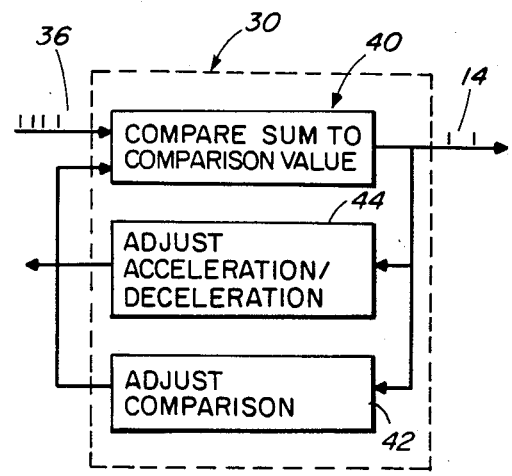
FIG. 5 is a partial functional block diagram for circuitry to carry out said alternative method.

For example, in FIGS. 4 and 5 are shown a modified partial flow chart and a corresponding modified timing signal generating means. In this embodiment, SUM is once again repetitively increased by $N+N+1$, but instead of comparing the value SUM with zero and decreasing SUM by the constant ACC each time that a timing signal 14 is provided, in this case SUM is compared to the product of NSTEPS (the number of steps taken so far) times the constant ACC. Thus each time a timing signal 14 is provided, the comparison value, NSTEPS times ACC, increases by the amount ACC; thus SUM is required to increase by the amount ACC again before another timing signal is provided, and with increases in the value N, the time it takes to increase by ACC decreases.

Also, in place of repetitively adding odd numbers (the $N+N+1$ computation described above and in the C language listing) to have SUM increase as $(N+1)^2$, other quadratic repetitive calculations can be used. For example, one can repetitively add N to have SUM increase as $N(N-1)/2$ or $N^2/2 - N/2$ (as in the assembly language listing); as SUM gets larger, $N^2/2$ predominates so that SUM is still effectively quadratic with respect to N.

What is claimed is:

1. Apparatus comprising
a stepper motor that rotates a given angle in response to each timing signal it receives,
calculating means for repetitively performing a calculation to provide calculation signals having values (SUM) which vary as a quadratic function of the number of times said calculation has been repeated, and
timing signal generating means for receiving said calculation signals and providing a series of timing signals spaced in time by varying amounts to said stepper motor, one said timing signal being generated each time said value (SUM) has changed by a set amount (ACC), whereby said timing signals cause said stepper motor to be accelerated.

2. The apparatus of claim 1 wherein said calculating means provides said calculating signals spaced in time by equal amounts.

3. The apparatus of claim 2 wherein said timing signal generating means includes
means to compare SUM with a comparison value, and
comparison adjustment means to adjust either said comparison value or SUM each time a timing signal is generated.

4. The apparatus of claim 3 wherein said comparison adjustment means includes means to decrease SUM by said set amount ACC.

5. The apparatus of claim 3 wherein said comparison adjustment means includes means to set said comparison value to the product of ACC and NSTEPS, where NSTEPS is the number of timing signals that have been generated, and ACC is a constant.

6. The apparatus of claim 2 wherein said calculating means includes count adjustment means to adjust the value N of a count signal each time a said calculation signal has been provided so that SUM varies quadratically with respect to N.

7. The apparatus of claim 6 wherein said count adjustment means includes means to increase N each time a said calculation signal is provided, whereby the value SUM increases with each repetitive calculation, and the period between said timing signals decreases with time.

8. The apparatus of claim 6 wherein said count adjustment means includes means to decrease N each time a said calculation signal is provided, whereby the value SUM decreases with each repetitive calculation, and the period between said timing signals increases with time.

9. The apparatus of claim 6 wherein said repetitive calculation is repetitively adding $N+N+1$.

10. The apparatus of claim 6 wherein said repetitive calculation is repetitively adding N.

11. The apparatus of claim 1 wherein said calculating means includes count adjustment means to adjust the value N of a count signal after a said calculation signal has been provided, wherein SUM varies quadratically with respect to N, and wherein said count adjustment means includes means to selectively increase N each time a said calculation signal is provided or decrease N each time a said calculation signal is provided or cause N to remain the same each time a said calculation signal is provided, whereby the period between said timing signals respectively decreases, increases or remains the same with respect to time.

12. The apparatus of claim 11 wherein said timing signal generating means includes acceleration/deceleration means to selectively adjust said count adjustment means in response to the number of timing signals that have been provided.

13. The apparatus of claim 11 wherein said calculating means and timing signal generating means are adapted to cause said stepper motor to operate a given number of steps by accelerating at a constant rate to a fixed speed, by operating at said fixed speed and by decelerating at a constant rate so that said given number of steps is reached as the deceleration is completed, and wherein said count adjustment means increases N each time a calculation signal is provided until N reaches a value corresponding to said fixed speed, and wherein said acceleration/deceleration adjustment means provides a signal indicating how many steps were required to reach said fixed speed, and said count adjustment means maintains N at that value until the number of steps remaining to reach said given number of steps equals the number required to reach said fixed speed, at which time N is decreased each time a said calculation signal is provided.

* * * * *